(12) United States Patent
Hill et al.

(10) Patent No.: US 12,581,164 B2
(45) Date of Patent: Mar. 17, 2026

(54) CUSTOMIZATION OF TARGETED MEDIA CONTENT

(71) Applicant: Roku, Inc., San Jose, CA (US)

(72) Inventors: Alexander P. Hill, Danville, CA (US); Snehal Karia, Fremont, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/744,307

(22) Filed: Jun. 14, 2024

(65) Prior Publication Data

US 2025/0386074 A1 Dec. 18, 2025

(51) Int. Cl.
| | |
|---|---|
| *H04N 21/458* | (2011.01) |
| *H04N 21/45* | (2011.01) |
| *H04N 21/466* | (2011.01) |
| *H04N 21/475* | (2011.01) |

(52) U.S. Cl.
CPC ....... *H04N 21/458* (2013.01); *H04N 21/4532* (2013.01); *H04N 21/466* (2013.01); *H04N 21/4755* (2013.01)

(58) Field of Classification Search
CPC ............. H04N 21/458; H04N 21/4532; H04N 21/466; H04N 21/4755
See application file for complete search history.

(56) References Cited

U.S. PATENT DOCUMENTS

| | | | |
|---|---|---|---|
| 2010/0036735 A1* | 2/2010 | Hamilton | G06Q 30/00 |
| 2012/0227064 A1* | 9/2012 | Neill | H04N 7/16 |
| 2012/0284745 A1 | 11/2012 | Strong | |
| 2013/0117783 A1 | 5/2013 | Kim | |
| 2015/0264418 A1 | 9/2015 | Jacobs et al. | |
| 2023/0188792 A1* | 6/2023 | Sahasi | H04N 21/4668 |

FOREIGN PATENT DOCUMENTS

| | | | | |
|---|---|---|---|---|
| KR | 20180067111 A * | 6/2018 | | G06Q 30/0217 |

OTHER PUBLICATIONS

Extended European Search Report dated Aug. 12, 2025, for the corresponding Application No. 25180801.0 in 7 pages.

* cited by examiner

*Primary Examiner* — Anthony Bantamoi
(74) *Attorney, Agent, or Firm* — Straylight LLP

(57) ABSTRACT

Disclosed herein are system, apparatus, article of manufacture, method and/or computer program product embodiments, and/or combinations and sub-combinations thereof, for processing, understanding, and defining media content. An example process can include receiving, from a media device, a user input indicative of a preferred level of exposure to targeted media content; configuring, based on the user input, one or more playback settings associated with a media content item to accommodate a customized amount of the targeted media content during playback of the media content item; and sending, to the media device, the media content item and the customized amount of the targeted media content.

18 Claims, 9 Drawing Sheets

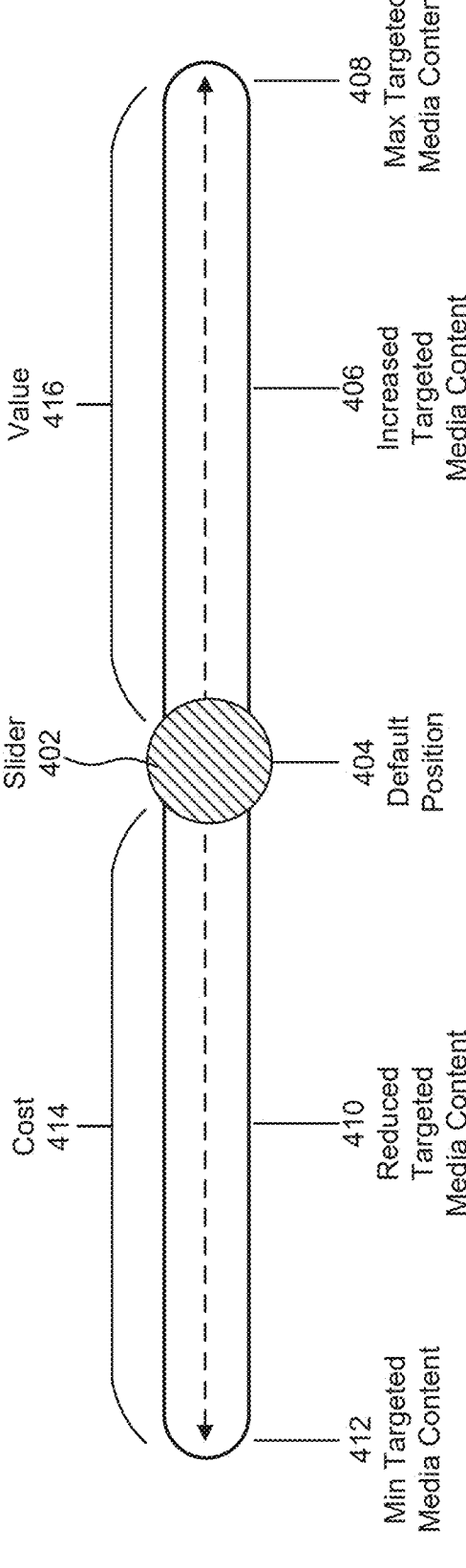
FIG. 4

500

RECEIVE, FROM A MEDIA DEVICE, A USER INPUT INDICATIVE OF A PREFERRED LEVEL OF EXPOSURE TO TARGETED MEDIA CONTENT
502

CONFIGURE, BASED ON THE USER INPUT, ONE OR MORE PLAYBACK SETTINGS ASSOCIATED WITH A MEDIA CONTENT ITEM TO ACCOMMODATE A CUSTOMIZED AMOUNT OF THE TARGETED MEDIA CONTENT DURING PLAYBACK OF THE MEDIA CONTENT ITEM
504

SEND, TO THE MEDIA DEVICE, THE MEDIA CONTENT ITEM AND THE CUSTOMIZED AMOUNT OF THE TARGETED MEDIA CONTENT
506

PRESENT, BY A MEDIA DEVICE, A GRAPHICAL USER INTERFACE (GUI) FOR SELECTING A PREFERRED LEVEL OF EXPOSURE TO TARGETED MEDIA CONTENT, WHEREIN THE GUI INCLUDES AT LEAST A FIRST OPTION FOR INCREASING THE PREFERRED LEVEL OF EXPOSURE TO THE TARGETED MEDIA CONTENT AND AT LEAST A SECOND OPTION FOR DECREASING THE PREFERRED LEVEL OF EXPOSURE TO THE TARGETED MEDIA CONTENT
602

RECEIVE, BY THE MEDIA DEVICE VIA THE GUI, A USER INPUT CORRESPONDING TO THE FIRST OPTION OR THE SECOND OPTION
604

RECEIVE, BY THE MEDIA DEVICE, A CUSTOMIZED AMOUNT OF THE TARGETED MEDIA CONTENT FOR PRESENTATION ON THE MEDIA DEVICE, WHEREIN THE CUSTOMIZED AMOUNT OF THE TARGETED MEDIA CONTENT IS BASED ON THE USER INPUT
606

FIG. 6

700

RECEIVING, BY A MACHINE LEARNING MODEL, A USER INPUT FROM A MEDIA DEVICE ASSOCIATED WITH A USER PROFILE, WHEREIN THE USER INPUT IS INDICATIVE OF A TOLERANCE LEVEL FOR TARGETED MEDIA CONTENT
702

PROCESSING, BY THE MACHINE LEARNING MODEL, THE USER INPUT AND THE USER PROFILE TO GENERATE A CUSTOMIZED TARGETED MEDIA CONTENT EXPERIENCE FOR THE MEDIA DEVICE, WHEREIN THE CUSTOMIZED TARGETED MEDIA CONTENT EXPERIENCE INCLUDES AT LEAST ONE OF A CUSTOMIZED AMOUNT OF TARGETED MEDIA CONTENT, A CUSTOMIZED FREQUENCY OF TARGETED MEDIA CONTENT, AND A CUSTOMIZED TYPE OF TARGETED MEDIA CONTENT
704

PROVIDING THE CUSTOMIZED TARGETED MEDIA CONTENT EXPERIENCE TO THE MEDIA DEVICE
706

FIG. 7

CUSTOMIZATION OF TARGETED MEDIA CONTENT

FIELD

This disclosure is generally directed to streaming media content, and more particularly, to customization of targeted media content based on user input.

SUMMARY

Provided herein are system, apparatus, article of manufacture, method and/or computer program product embodiments, and/or combinations and sub-combinations thereof, for customizing targeted media content.

In some aspects, a method is provided for customizing targeted media content. The method can operate in a media device that is used to present or playback the media content (e.g., using a display device is communicatively coupled to the media device) and/or in a server that is coupled to one or more media devices.

The method can operate by receiving, from a media device, a user input indicative of a preferred level of exposure to targeted media content. The method can further include configuring, based on the user input, one or more playback settings associated with a media content item to accommodate a customized amount of the targeted media content during playback of the media content item. The method can further include sending, to the media device, the media content item and the customized amount of the targeted media content.

In some aspects, a system is provided for customizing targeted media content. The system can include one or more memories and at least one processor coupled to at least one of the one or more memories and configured to receive, from a media device, a user input indicative of a preferred level of exposure to targeted media content. The at least one processor of the system can be configured to configure, based on the user input, one or more playback settings associated with a media content item to accommodate a customized amount of the targeted media content during playback of the media content item. The at least one processor of the system can also be configured to send, to the media device, the media content item and the customized amount of the targeted media content.

In some aspects, a non-transitory computer-readable medium is provided for customizing targeted media content. The non-transitory computer-readable medium can have instructions stored thereon that, when executed by at least one computing device, cause the at least one computing device to receive, from a media device, a user input indicative of a preferred level of exposure to targeted media content. The instructions of the non-transitory computer-readable medium can, when executed by the at least one computing device, cause the at least one computing device to configure, based on the user input, one or more playback settings associated with a media content item to accommodate a customized amount of the targeted media content during playback of the media content item. The instructions of the non-transitory computer-readable medium also can, when executed by the at least one computing device, cause the at least one computing device to send, to the media device, the media content item and the customized amount of the targeted media content.

BRIEF DESCRIPTION OF THE FIGURES

The accompanying drawings are incorporated herein and form a part of the specification.

FIG. 4 is a diagram illustrating an example user interface for receiving user input used to customize targeted media content, according to some examples of the present disclosure;

FIG. 5 is a diagram illustrating a flowchart of an example method for generating customized targeted media, according to some examples of the present disclosure;

FIG. 6 is a diagram illustrating a flowchart of another example method for generating customized targeted media, according to some examples of the present disclosure;

FIG. 7 is a diagram illustrating a flowchart of another example method for generating customized targeted media, according to some examples of the present disclosure;

In the drawings, like reference numbers generally indicate identical or similar elements. Additionally, generally, the left-most digit(s) of a reference number identifies the drawing in which the reference number first appears.

DETAILED DESCRIPTION

Users can generally access and consume videos using client devices such as, for example and without limitation, smart phones, set-top boxes, desktop computers, laptop computers, tablet computers, televisions (TVs), IPTV receivers, media devices, monitors, projectors, smart wearable devices (e.g., smart watches, smart glasses, head-mounted displays (HMDs), etc.), appliances, and Internet-of-Things (IoT) devices, among others. The videos can include, for example, live video content broadcast by a content server(s) to the client devices, pre-recorded video content available to the client devices on-demand, streaming video content, etc. In some instances, the videos can be customized for one or more users/audiences, geographic areas, devices, markets, demographics, etc. Moreover, the videos can be adjusted to include additional content such as targeted media content (e.g., media content that promotes or is otherwise associated with a product, service, brand, and/or event).

In some cases, different users may have different tolerance levels for the amount of targeted media content that is presented to them. For instance, some users may prefer to avoid targeted media content altogether while others may be willing to increase their level of exposure to targeted media content in return for some value proposition.

Provided herein are system, apparatus, device, method and/or computer program product embodiments, and/or combinations and sub-combinations thereof, for generating customized media content that is based on user input. In some aspects, a user interface can be presented (e.g., via a media device) that permits a user to provide an input indicative of a preferred level of exposure to targeted media content. In some examples, the user input can be used to generate media content that includes customized amounts of targeted media content that is based on the user input. For instance, media content can be customized to include additional targeted media content in response to a user input indicative of a higher tolerance for targeted media content. In another example, media content can be customized to include reduced amount of targeted media content in response to a user input indicative of a lower tolerance for targeted media content.

Figure 1:
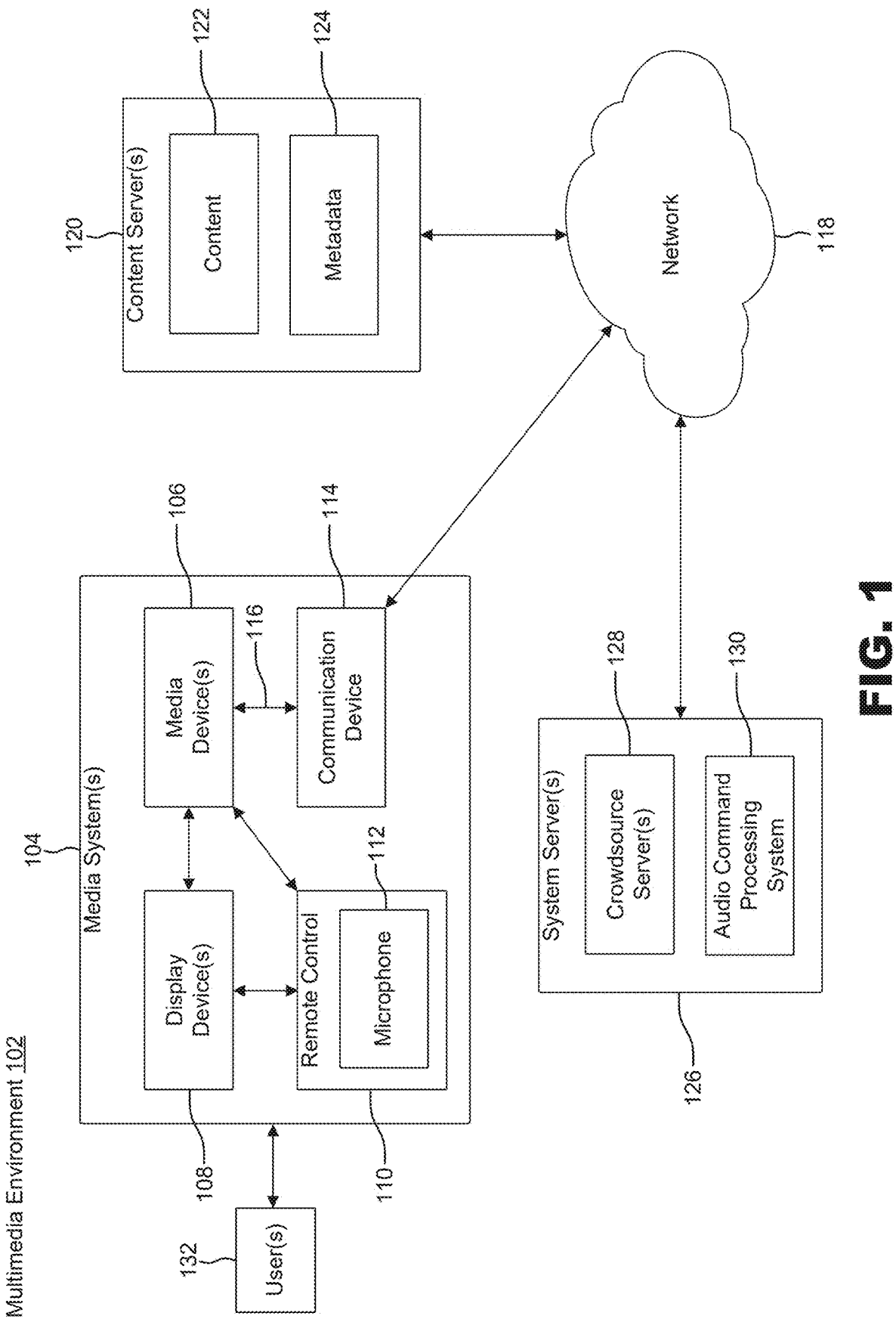
FIG. 1 illustrates a block diagram of a multimedia environment, according to some examples of the present disclosure.

Various embodiments, examples, and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, television, tablet, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice, the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, and/or any other content or data objects in electronic form. In some aspects, content 122 may include on-demand content, free ad-supported TV (FAST); advertising-based video on demand (AVOD); linear content, non-linear content, etc. In some cases, content 122 may be referred to herein as media content or media content item(s).

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining to or relating to the content 122. Metadata 124 may also or alternatively include one or more indexes of content 122, such as but not limited to a trick mode index. In one illustrative example, metadata 124 may include one or more manifest files (e.g., XML files) that include metadata that is associated with a video stream such as, for instance, a dynamic adaptive streaming over HTTP (DASH) media stream or a HTTP live streaming (HLS) media stream.

In some examples, the content server 120 or the media device 106 can process content 122 and/or metadata 124 to identify portions of content 122 that include targeted media content. As used herein, targeted media content may include any type of media content (e.g., video content, image content, audio content, text content, etc.) that promotes or is otherwise associated with a product, service, brand, and/or event. In some configurations, content server 120 or media device 106 can identify targeted media content within content 122 based on metadata 124. For instance, metadata 124 can be used to derive one or more playback properties associated with content 122 such as playback duration; content server address(es) (e.g., uniform resource locator(s) URLs); closed-captioning content; encryption status; etc. In some cases, media device 106 or content sever 120 can use one or more of the playback properties (e.g., based on metadata 124) to identify portions of content 122 that correspond to targeted media content.

In some examples, the content server 120 or the media device 106 can process media content segments to extract features and information, such as contextual information, from the media content segments and classify the media content segments based on the extracted features and information. In some examples, the content server 120 or the media device 106 can determine and/or extract information (e.g., contextual information, content information and/or attributes, segment characteristics, etc.) about one or more segments of media content, and use the information to categorize the one or more segments of the media content. In some configurations, the content server 120 or the media device 106 can use the extracted information (e.g., contextual information) to classify portions of content 122 as targeted media content.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126. In some aspects, system servers 126 can store information associated with users 132 (e.g., user profile data, user preferences, historical data, etc.).

The media devices 106 may exist in thousands or millions of media systems 104. Accordingly, the media devices 106 may lend themselves to crowdsourcing embodiments and, thus, the system servers 126 may include one or more crowdsource servers 128. For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
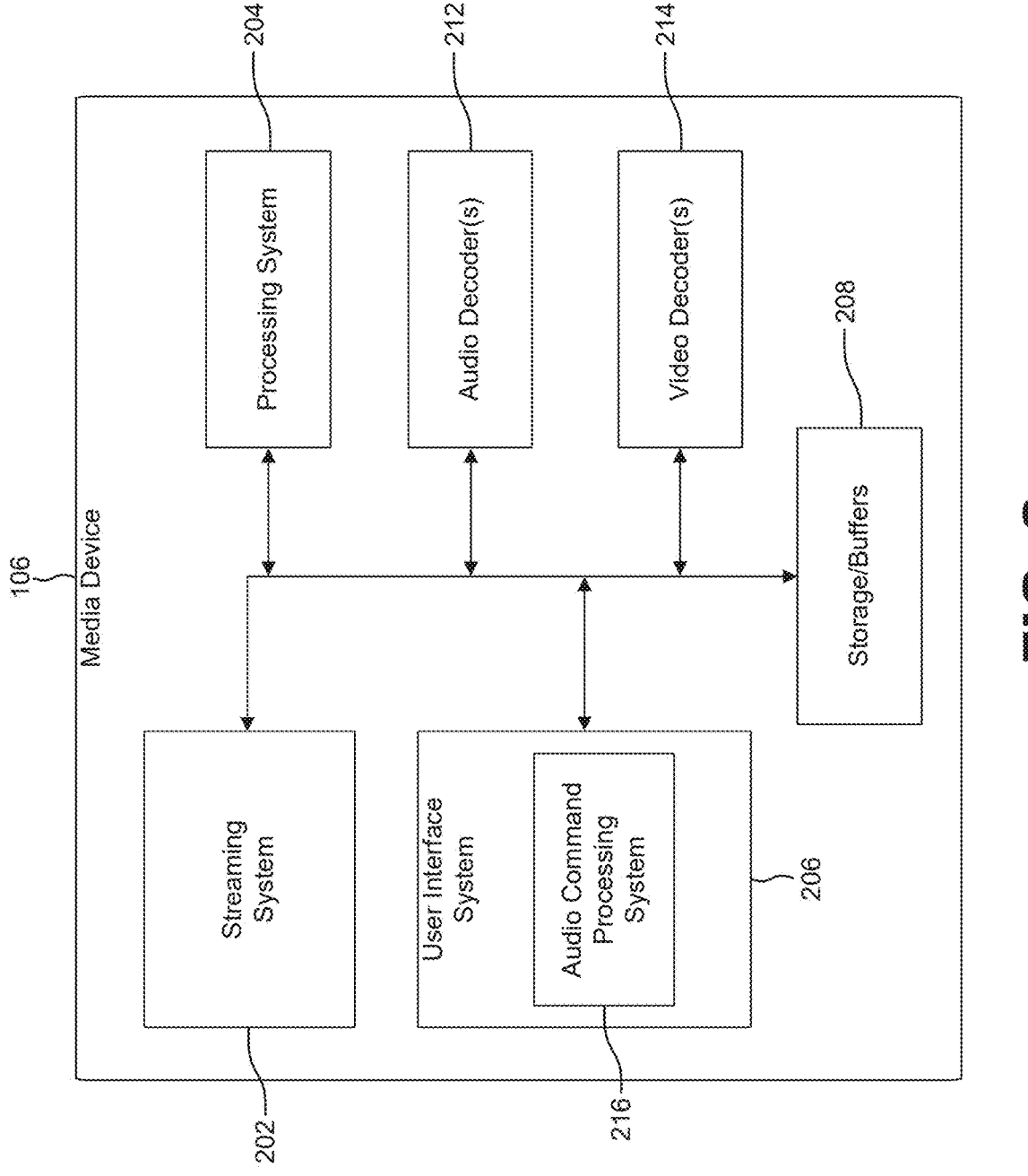
FIG. 2 illustrates a block diagram of a streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some aspects of the present technology. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Customizing Amount and Type of Targeted Media Content

Referring to FIG. 1, content server(s) 120, system servers 126, and/or media devices 106 can be configured to perform applicable functions related to customizing content 122. For example, users 132 can provide an input (e.g., via display devices 108, remote control 110, and/or media device(s) 106) indicative of a preferred level of exposure to targeted media content (e.g., video, audio, image, text, etc. that is associated with a product, service, brand, and/or event, such as a commercial). In some cases, content server(s) 120, system server(s) 126, and/or media devices 106 can implement one or more algorithms (e.g., heuristic-based algorithms, rule-based algorithms, machine learning models, etc.) that can be used process the user input and generate a customized targeted media content experience for the user. The customized targeted media content experience can include a customized amount of targeted media content, a customized frequency in presentation of targeted media content, a customized type of targeted media content, any other type of modification to the presentation of content 122, and/or any combination thereof.

Figure 3:
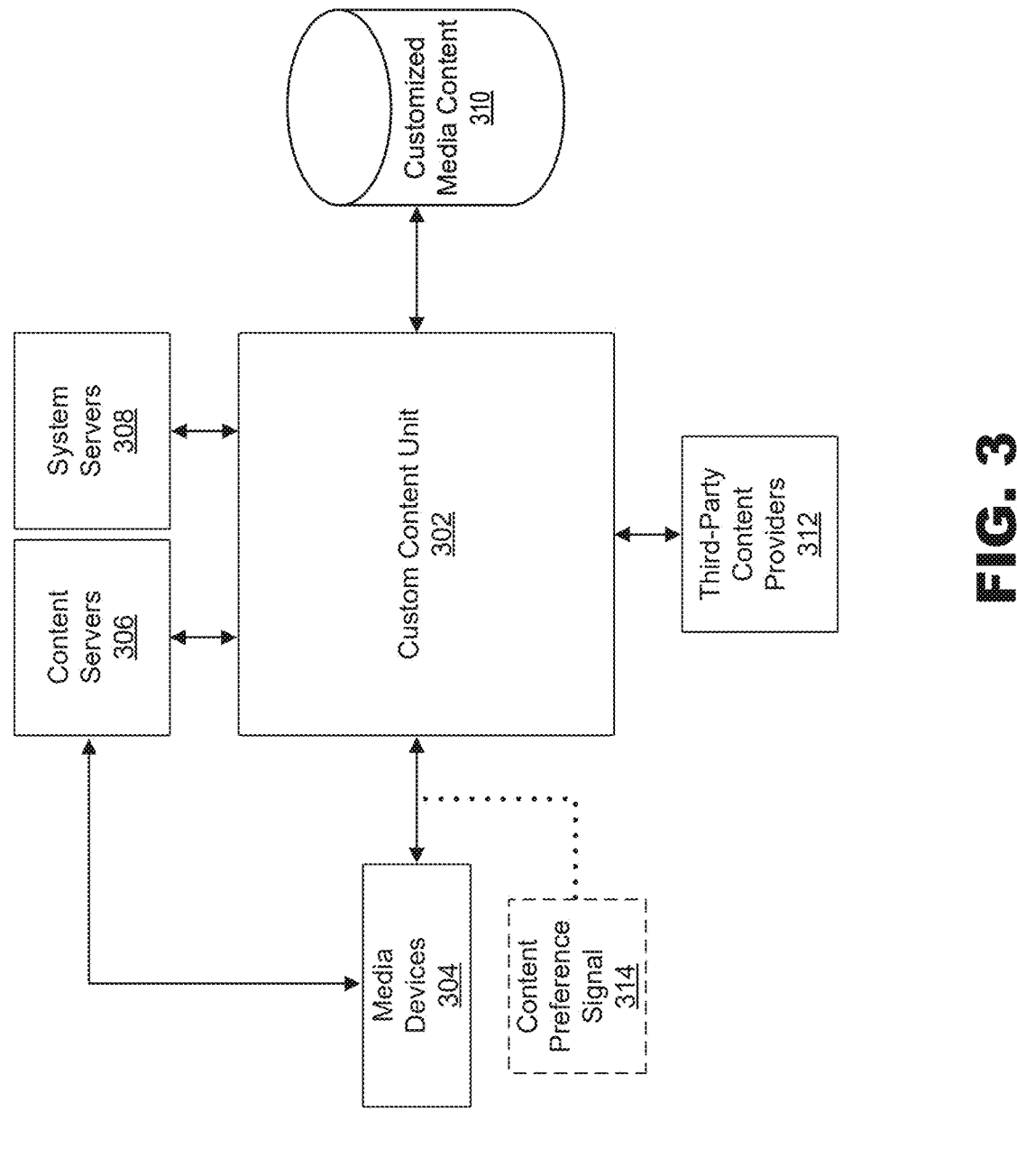
FIG. 3 is a diagram illustrating an example system for customizing targeted media content, according to some examples of the present disclosure.

FIG. 3 is an example of a system 300 that can be used to customize content (e.g., targeted media content) based on user input or user preferences. In some examples, system 300 can include custom content unit 302 which can be configured to implement algorithms (e.g., machine learning algorithms, rule-based algorithms, etc.) for creating customized content. In some configurations, custom content unit 302 can be implemented as part of one or more electronic devices that can interface with media devices 304, content servers 306, system servers 308, and/or third-party content providers 312. Alternatively, or additionally, custom content unit 302 can be implemented as part of media devices 304, content servers 306, and/or system servers 308. Depending on the desired configuration, customized media content 310 may be communicated directly to media devices 304. Similarly, customized content may be communicated directly from one or more content servers 306 to media devices 304. In some examples, media devices 304 may correspond to media device(s) 106; content servers 306 may correspond to content server(s) 120; and/or system servers 308 may correspond to system server(s) 126.

In some aspects, custom content unit 302 can receive one or more inputs (e.g., content preference signal) from media devices 304 that are indicative of a preferred or desired level (e.g., amount, quantity, etc.) of targeted media content. That is, media devices 304 can provide a user interface (UI) element that can be configured to receive content preference signal 314, which indicates a tolerance level for targeted media content.

FIG. 4 illustrates an example user interface 400 that can be used to receive a signal (e.g., content preference signal 314) that indicates a preferred level of targeted media content. As illustrated, user interface 400 corresponds to a slider interface having slider element 402. However, those skilled in the art will recognize that the present technology is not limited to a specific UI implementation and alternative UI elements are expressly contemplated herein (e.g., radio button, text box, drop-down menu, voice command, etc.).

In some aspects, slider element 402 can have a default position 404. In some aspects, default position 404 may correspond to a default or baseline amount of targeted media content. In some cases, slider element 402 can be moved or positioned in a rightward direction (e.g., position 406) that is associated with an increased amount of targeted media content. In some examples, slider element 402 can be moved or positioned to the far right (e.g., position 408) that is associated with a maximum amount of targeted media content. In some configurations, slider element 402 can be moved or positioned in a leftward direction (e.g., position 410) that is associated with a reduced amount of targeted media content. In some instances, slider element 402 can be moved or positioned to the far left (e.g., position 412) that is associated with minimal amount (e.g., zero) of targeted media content. Although user interface 400 is illustrated as having five options (e.g., default position 404, position 406, position 408, position 410, and position 412), those skilled in the art will recognize that the present technology is not limited to any particular number of settings, options, alternatives, positions, etc.

In some examples, the preferred level of targeted media content can be associated with a cost 414 and/or a value 416 that can be dependent on the user selection. For instance, user selection of position 406 or position 408, which increases the amount of targeted media content, can be associated with a value 416. In some aspects, value 416 can be a reward and/or incentive such as monetary discount(s), coupon(s), point(s), etc. In some cases, the value 416 can increase for higher levels of targeted media content (e.g., position 408 can have a value 416 corresponding to a 50% off coupon for a movie and position 406 can have a value 416 corresponding to a 25% off coupon for a movie).

In some configurations, cost 414 can increase for lower levels of targeted media content. In one illustrative example, position 412 corresponding to a minimal amount of targeted media content can have a cost 414 of $10/month. In a further example, position 410 corresponding to a reduced amount of targeted media content can have a cost 414 of $5/month. In some aspects, default position 404 can correspond to a default cost 414 and a default value 416. For instance, the cost 414 associated with default position 404 can be zero and the value 416 associated with default position 404 can be free access to one or more types of content.

Returning to FIG. 3, custom content unit 302 can use the content preference signal 314 from media devices 304 to generate customized media content 310. In some aspects, customized media content 310 can include content that has been modified to accommodate different levels and/or types of targeted media content.

Custom content unit 302 can generate customized media content 310 to include additional targeted media content in response to receiving a content preference signal 314 corresponding to an increased amount of targeted media content. In some cases, the additional targeted media content can be included by increasing the number of slots or breaks that are used to present targeted media content. Alternatively, or in addition, the increased amount of targeted media content can be included by increasing the time of existing slots or breaks.

In some cases, custom content unit 302 can generate customized media content 310 to include reduced amount of targeted media content in response to receiving a content preference signal 314 corresponding to a decreased amount of targeted media content. In some instances, the targeted media content can be decreased by reducing the number of slots or breaks that are used for presenting targeted media content. Alternatively, or in addition, the targeted media content can be reduced by decreasing the time of existing slots or breaks. Alternatively, or in addition, the targeted media content can be reduced by presenting alternative forms of media content during times that were designated for targeted media content. For instance, custom content unit 302 may generate customized media content 310 that includes media such as music, videos, trivia, games, etc.

In some examples, custom content unit 302 can process content received from content servers 306 to generate customized media content 310 that includes a customized amount and/or type of targeted media content. In some cases, content received from content servers 306 may be packaged (e.g., assembled, arranged, configured, etc.) to include targeted media content at pre-configured slots. For example, a content item such as a movie, television show, channel, etc. may be pre-configured to include breaks for targeted media content. In some aspects, custom content unit 302 can unpack (e.g., process, unbundle, unwrap, etc.) the content to identify and re-configure the breaks to accommodate either more or less targeted media content. In one illustrative example, custom content unit 302 can eliminate and/or reduce one or more of the pre-existing breaks in the content item, and the content item can be repackaged with reduced number and/or duration of breaks in order to accommodate a reduced amount of targeted media content. In another example, custom content unit 302 can insert new breaks and/or extend pre-existing breaks in the media content in order to accommodate an increased amount of targeted media content.

In some cases, custom content unit 302 may accommodate additional targeted media content by overlaying the targeted media content on the primary media content (e.g., banner or picture at bottom of screen while movie is playing). In some instances, custom content unit 302 may accommodate additional targeted media content (e.g., within customized media content 310) by displaying the targeted media content on a side panel (e.g., splitting a display window to accommodate primary media content and targeted media content).

In some aspects, the content received from content servers 306 may correspond to live media content (e.g., sporting event, awards show, live concert, evening news broadcast, etc.). In some examples, custom content unit 302 may generate customized media content 310 corresponding to live media content that includes additional targeted media content by buffering and delaying presentation of the live media content to accommodate additional/longer breaks for targeted media content. In some cases, custom content unit 302 may generate customized media content 310 corresponding to live media content that includes a reduced amount of targeted media content by providing personalized media content during a designated break that would otherwise include targeted media content. That is, custom content unit 302 can generate customized media content 310 that includes personalized content (e.g., music, videos, games, trivia, etc.) during a time that would otherwise include targeted media content until the live broadcast resumes. For example, custom content unit 302 can generate customized media content 310 that includes music videos during a break of a live sporting event that is intended for targeted media content.

In some aspects, content preference signal 314 can be a global setting that can be applied to all media devices, profiles, accounts, etc. that are associated with the content preference signal 314. In some configurations, content preference signal 314 can be associated with a particular media device (e.g., one or more of media devices 304); a user profile; a media content item; a user account; a type of media content; a media application; and/or any combination thereof. For instance, a user may provide a content preference signal 314 that indicates a lower tolerance for targeted media content during a particular movie or during episodes of a particular program. In another example, a user may provide a content preference signal 314 that indicates a higher tolerance for targeted media content while using a table device and a lower tolerance for targeted media content while using a television. In another example, a user may provide a content preference signal 314 that indicates a lower tolerance for targeted media content when a primary user profile is active and a higher tolerance for targeted media content when a secondary user profile is active.

In some cases, custom content unit 302 may include machine learning algorithms and/or rules-based algorithms that are configured to generate customized media content 310 based on multiple inputs that can include content preference signal 314 as well as user data from system servers 308 (e.g., user profile(s), user preference(s), viewing history, purchase history, account history, etc.). That is, custom content unit 302 can generate different sets of customized media content 310 for the same content preference signal 314 by processing and/or considering additional/different types of data. In one illustrative example, a first user that is relatively new may provide a content preference signal 314 indicating a preference for reduced amount of targeted media content and custom content unit 302 can generate customized media content 310 that removes all targeted media content from the initial episodes of a series. Furthermore, a second user that is well-established may provide a content preference signal 314 indicating a similar preference for reduced amount of targeted media content and custom content unit 302 can generate customized media content 310 that includes a reduced amount of targeted media content from the same initial episodes of the series. That is, custom content unit 302 can infer that the second user will tolerate that targeted media content (despite similar content preference signal 314) based on other data (e.g., viewing history of second user).

In some instances, custom content unit 302 may generate customized media content 310 that includes different types of content based on content preference signal 314 and/or any other data received from system servers 308. For example, custom content unit 302 may generate customized media content 310 that includes offers for additional premium content based on a content preference signal 314 that indicates a preference for reduced amount of targeted media content. In another example, custom content unit 302 may generate customized media content 310 that eliminates or reduces any offers for premium content based on a content preference signal 314 that indicates a high tolerance for targeted media content.

In some examples, custom content unit 302 can send the content preference signal 314 to one or more third-party content providers 312 (e.g., third-party applications that are configured to provide content via media devices 304). In some cases, the third-party content providers 312 can use the content preference signal 314 to adjust presentation (e.g., duration, frequency, type, etc.) of targeted media content.

FIG. 5 is a flowchart for a method 500 for generating customized targeted media. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example.

In step 502, the method 500 includes receiving, from a media device, a user input indicative of a preferred level of exposure to targeted media content. For example, custom content unit 302 can receive content preference signal 314 from media devices 304. In some cases, the user input can be associated with at least one of a user profile, a user account, the media device, the media content item, and a media content type. That is, the content preference signal 314 can be a global signal that applies to all content associated with media devices 304 or the content preference signal 314 can be associated with a particular media device, content item, content type, user profile, etc.

In some cases, the user input can be received via a user interface element that includes at least a first option for increasing the preferred level of exposure to the targeted media content and at least a second option for decreasing the preferred level of exposure to the targeted media content. For example, user interface 400 can be used to receive content preference signal 314. In some aspects, user interface 400 can include position 406 and/or position 408 for increasing preferred level of exposure to targeted media content and position 410 and/or position 412 for decreasing the preferred level of exposure to targeted media content. In some aspects, the first option for increasing the preferred level of exposure to the targeted media content can be associated with a value proposition and the second option for decreasing the preferred level of exposure to the targeted media content can be associated with a cost. For example, position 406 for increasing targeted media content can be associated with value 416 and position 410 for reduced targeted media content can be associated with cost 414.

In step 504, the method 500 includes configuring, based on the user input, one or more playback settings associated with a media content item to accommodate a customized amount of the targeted media content during playback of the media content item. For instance, custom content unit 302 can configure, based on content preference signal 314, one or more playback settings associated with a media content item (e.g., received from content servers 306) to accommodate a customized amount of targeted media content. In some aspects, the one or more playback settings can include at least one of a number of slots for presenting the targeted media content and a duration of one or more slots for presenting the targeted media content. In some examples, the media content item can correspond to at least one of on-demand content, linear media content, and live media content.

In step 506, the method 500 includes sending, to the media device, the media content item and the customized amount of the targeted media content. For example, custom content unit 302 can send customized media content 310 to media devices 304. The customized media content 310 can include the media content item and the customized amount of the targeted media content.

In some examples, the method 500 can include processing, by a machine learning model, the user input to determine the customized amount of the targeted media content. For instance, custom media content unit 302 can include one or more machine learning models that are configured to process content preference signal 314 to determine the customized amount of targeted media content that is included in customized media content 310.

In some aspects, the method 500 can include processing, by a machine learning model, the user input to identify at least one other media content item for recommendation to a user associated with the media device. For instance, custom content unit 302 can include one or more machine learning models that are configured to process content preference signal 314 to identify media content that can be recommended to a user associated with media devices 304. In one illustrative example, custom content unit 302 may recommend additional premium media content based on a content preference signal 314 requesting a reduced amount of targeted media content.

In some cases, the method 500 can include unpackaging the media content item to identify a plurality of media content assets; identifying at least a portion of the plurality of media content assets that are associated with targeted media content; and modifying the portion of the plurality of media content assets that are associated with the targeted media content to accommodate the customized amount of the targeted media content. For example, custom content unit 302 can unpack media content from content servers 306 to identify a plurality of media content assets (e.g., segments of show, targeted media content, etc.). In some cases, custom content unit 302 can identify portions of the media content associated with targeted media content and modify them to accommodate a customized amount of targeted media content.

In some examples, the method 500 can include sending the user input indicative of the preferred level of exposure to targeted media content to a service provider associated with a third-party application configured to deliver media content on the media device. For instance, custom content unit 302 can send content preference signal 314 to third-party content providers 312.

FIG. 6 is a flowchart for a method 500 for generating customized targeted media. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example.

In step 602, the method 600 includes presenting, by a media device, a graphical user interface (GUI) for selecting a preferred level of exposure to targeted media content, wherein the GUI includes at least a first option for increasing the preferred level of exposure to the targeted media content and at least a second option for decreasing the preferred level of exposure to the targeted media content. For example, media devices 304 can present a graphical user interface (GUI) for a user to provide content preference signal 314. The GUI can include options for increasing/decreasing the preferred level of exposure to targeted media content (e.g., see user interface 400 in FIG. 4).

In step 604, the method 600 includes receiving, by the media device via the GUI, a user input corresponding to the first option or the second option. For example, media devices 304 can receive content preference signal 314 via the GUI (e.g., user interface 400).

In step 606, the method 600 includes receiving, by the media device, a customized amount of the targeted media content for presentation on the media device, wherein the customized amount of the targeted media content is based on the user input. For example, media devices 304 can receive customized media content 310 from custom content unit 302. The customized media content 310 can include a customized amount of targeted media content for presentation on media devices 304 and the customized amount of the targeted media content can be based on content preference signal 314. In some cases, custom content unit 302 may be implemented within media devices 304. In some examples, custom content unit 302 may be implemented on an external device such as a server (e.g., a dedicated server, system servers 308, etc.).

FIG. 7 is a flowchart for a method 700 for generating customized targeted media. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example.

In step 702, the method 700 includes receiving, by a machine learning model, a user input from a media device associated with a user profile, wherein the user input is indicative of a tolerance level for targeted media content. For example, custom content unit 302 can include a machine learning model that receives content preference signal 314 from media devices 304.

In step 704, the method 700 includes processing, by the machine learning model, the user input and the user profile to generate a customized targeted media content experience for the media device, wherein the customized targeted media content experience includes at least one of a customized amount of targeted media content, a customized frequency of targeted media content, and a customized type of targeted media content. For instance, custom content unit 302 can include a machine learning model that processes content preference signal 314 along with user profile data (e.g., from system servers 308) to generate customized media content 310. In some aspects, the user profile data can include user demographic data, user preferences, user viewing history, user purchase history, etc. In some cases, customized media content 310 can include customized amount of targeted media content, customized frequency of targeted media content, and/or customized type of targeted media content that is based on content preference signal 314 and user profile data.

In step 706, the method 700 includes providing the customized targeted media content experience to the media device. For example, custom content unit 302 can provide customized media content 310 to media devices 304.

Figure 8:
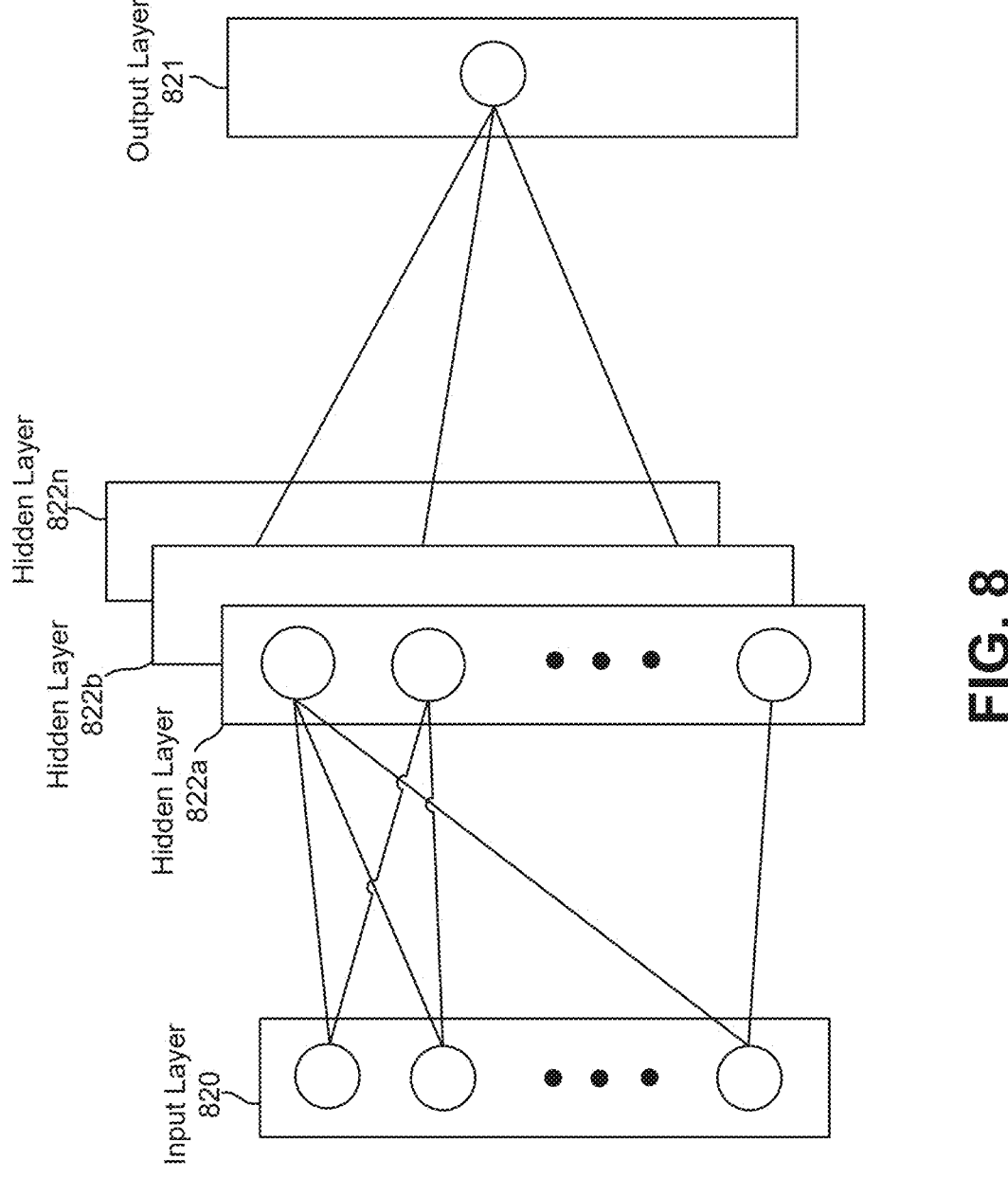
FIG. 8 is a diagram illustrating an example of a neural network architecture, according to some examples of the present disclosure.

FIG. 8 is a diagram illustrating an example of a neural network architecture 800 that can be used to implement some or all of the neural networks described herein. The neural network architecture 800 can include an input layer 820 can be configured to receive and process data to generate one or more outputs. The neural network architecture 800 also includes hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network architecture 800 further includes an output layer 821 that provides an output resulting from the processing performed by the hidden layers 822a, 822b, through 822n.

The neural network architecture 800 is a multi-layer neural network of interconnected nodes. Each node can represent a piece of information. Information associated with the nodes is shared among the different layers and each layer retains information as information is processed. In some cases, the neural network architecture 800 can include a feed-forward network, in which case there are no feedback connections where outputs of the network are fed back into itself. In some cases, the neural network architecture 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network architecture 800 are shown as having multiple output lines, a node can have a single output and all lines shown as being output from a node represent the same output value.

In some cases, each node or interconnection between nodes can have a weight that is a set of parameters derived from the training of the neural network architecture 800. Once the neural network architecture 800 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 800 to be adaptive to inputs and able to learn as more and more data is processed.

The neural network architecture 800 is pre-trained to process the features from the data in the input layer 820 using the different hidden layers 822a, 822b, through 822n in order to provide the output through the output layer 821.

In some cases, the neural network architecture 800 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 800 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total = \Sigma(\frac{1}{2}(target - output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 800 can perform a backward pass by determining which inputs (weights) most contributed to the loss of the network, and can adjust the weights so that the loss decreases and is eventually minimized.

The neural network architecture 800 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 800 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 9:
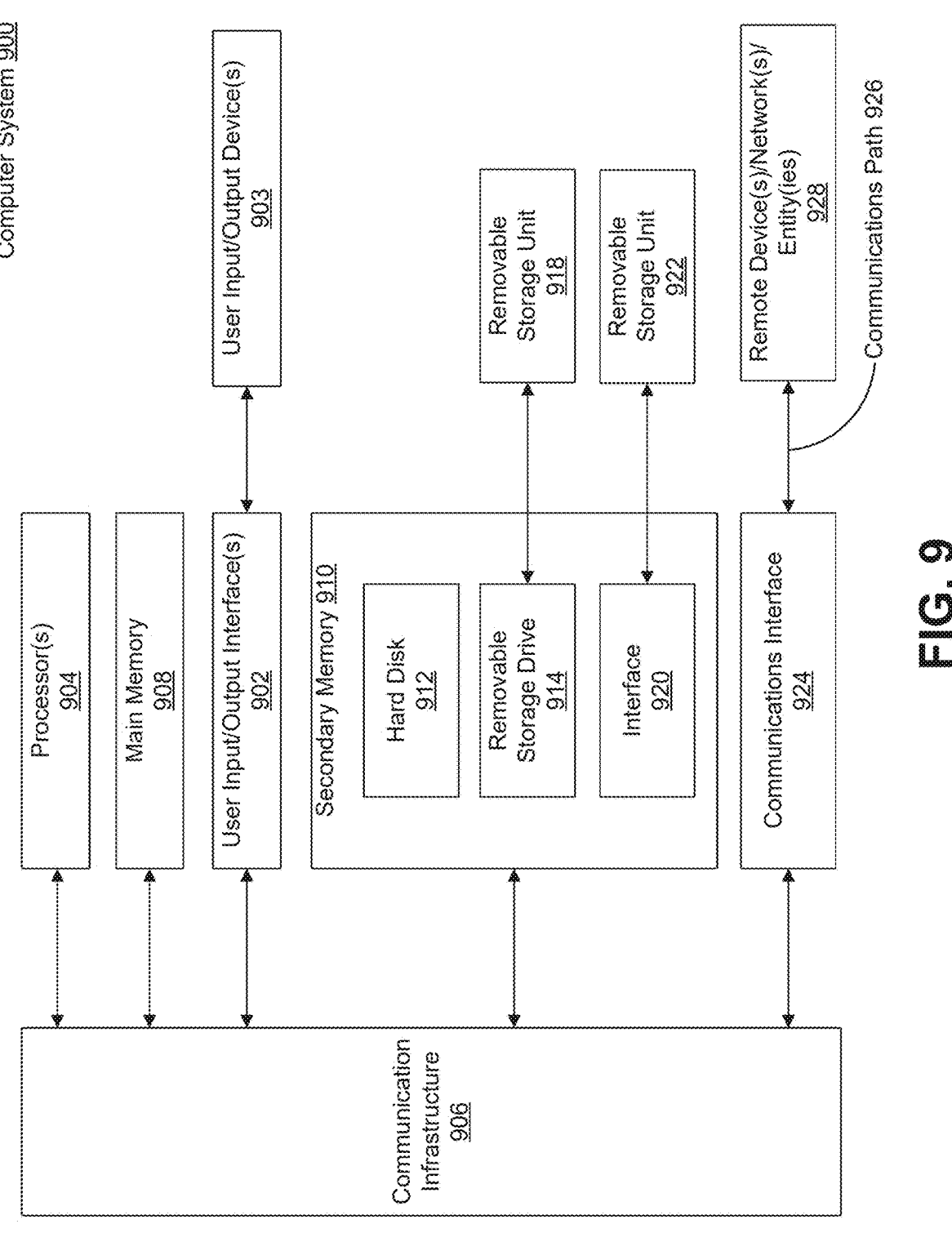
FIG. 9 illustrates an example computer system that can be used for implementing various aspects of the present disclosure.

Various aspects and examples may be implemented, for example, using one or more well-known computer systems, such as computer system 900 shown in FIG. 9. For example, the media device 106 may be implemented using combinations or sub-combinations of computer system 900. Also or alternatively, one or more computer systems 900 may be used, for example, to implement any of the aspects and examples discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may include a communication or network interface 924. Communication interface 924 may enable computer system 900 to communicate and interact with any combination of external devices, external networks, external entities, etc. (individually and collectively referenced by reference number 928). For example, communication interface 924 may allow computer system xx00 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Examples of the Disclosure Include:

Aspect 1. A system comprising: one or more memories; and at least one processor coupled to at least one of the one or more memories and configured to perform operations comprising: receive, from a media device, a user input indicative of a preferred level of exposure to targeted media content; configure, based on the user input, one or more playback settings associated with a media content item to accommodate a customized amount of the targeted media content during playback of the media content item; and send, to the media device, the media content item and the customized amount of the targeted media content.

Aspect 2. The system of Aspect 1, wherein the at least one processor is configured to perform operations comprising: process, by a machine learning model, the user input to determine the customized amount of the targeted media content.

Aspect 3. The system of any of Aspects 1 to 2, wherein the at least one processor is configured to perform operations comprising: process, by a machine learning model, the user input to identify at least one other media content item for recommendation to a user associated with the media device.

Aspect 4. The system of any of Aspects 1 to 3, wherein the one or more playback settings include at least one of a number of slots for presenting the targeted media content and a duration of one or more slots for presenting the targeted media content.

Aspect 5. The system of any of Aspects 1 to 4, wherein to configure the one or more playback settings associated with the media content item the at least one processor is configured to perform operations comprising: unpackage the media content item to identify a plurality of media content assets; identify at least a portion of the plurality of media content assets that are associated with targeted media content; and modify the portion of the plurality of media content assets that are associated with the targeted media content to accommodate the customized amount of the targeted media content.

Aspect 6. The system of any of Aspects 1 to 5, wherein the at least one processor is configured to perform operations comprising: send the user input indicative of the preferred level of exposure to targeted media content to a service provider associated with a third-party application configured to deliver media content on the media device.

Aspect 7. The system of any of Aspects 1 to 6, wherein the user input is associated with at least one of a user profile, a user account, the media device, the media content item, and a media content type.

Aspect 8. The system of any of Aspects 1 to 7, wherein the media content item corresponds to at least one of on-demand media content, linear media content, and live media content.

Aspect 9. The system of any of Aspects 1 to 8, wherein the user input is received via a user interface element that includes at least a first option for increasing the preferred level of exposure to the targeted media content and at least a second option for decreasing the preferred level of exposure to the targeted media content.

Aspect 10. The system of Aspect 9, wherein the first option for increasing the preferred level of exposure to the targeted media content is associated with a value proposition and the second option for decreasing the preferred level of exposure to the targeted media content is associated with a cost.

Aspect 11. A computer-implemented method for processing media content, the computer-implemented method comprising: receiving, from a media device, a user input indicative of a preferred level of exposure to targeted media content; configuring, based on the user input, one or more playback settings associated with a media content item to accommodate a customized amount of the targeted media content during playback of the media content item; and sending, to the media device, the media content item and the customized amount of the targeted media content.

Aspect 12. The computer-implemented method of Aspect 11, further comprising: processing, by a machine learning model, the user input to determine the customized amount of the targeted media content.

Aspect 13. The computer-implemented method of any of Aspects 11 to 12, further comprising: processing, by a machine learning model, the user input to identify at least one other media content item for recommendation to a user associated with the media device.

Aspect 14. The computer-implemented method of any of Aspects 11 to 13, wherein the one or more playback settings include at least one of a number of slots for presenting the targeted media content and a duration of one or more slots for presenting the targeted media content.

Aspect 15. The computer-implemented method of any of Aspects 11 to 14, wherein configuring the one or more playback settings associated with the media content item further comprises: unpackaging the media content item to identify a plurality of media content assets; identifying at least a portion of the plurality of media content assets that are associated with targeted media content; and modifying the portion of the plurality of media content assets that are associated with the targeted media content to accommodate the customized amount of the targeted media content.

Aspect 16. The computer-implemented method of any of Aspects 11 to 15, further comprising: sending the user input indicative of the preferred level of exposure to targeted media content to a service provider associated with a third-party application configured to deliver media content on the media device.

Aspect 17. The computer-implemented method of any of Aspects 11 to 16, wherein the user input is associated with at least one of a user profile, a user account, the media device, the media content item, and a media content type.

Aspect 18. The computer-implemented method of any of Aspects 11 to 17, wherein the media content item corresponds to at least one of on-demand media content, linear media content, and live media content.

Aspect 19. The computer-implemented method of any of Aspects 11 to 18, wherein the user input is received via a user interface element that includes at least a first option for increasing the preferred level of exposure to the targeted media content and at least a second option for decreasing the preferred level of exposure to the targeted media content.

Aspect 20. A non-transitory computer-readable medium having instructions stored thereon that, when executed by at least one computing device, cause the at least one computing device to perform operations comprising: receive, from a media device, a user input indicative of a preferred level of exposure to targeted media content; configure, based on the user input, one or more playback settings associated with a media content item to accommodate a customized amount of the targeted media content during playback of the media content item; and send, to the media device, the media content item and the customized amount of the targeted media content.

What is claimed is:

1. A system comprising:
one or more memories; and
at least one processor coupled to at least one of the one or more memories and configured to perform operations comprising:
receive, from a media device, a user input indicative of a preferred level of exposure to targeted media content;
configure, based on the user input, one or more playback settings associated with a media content item to accommodate a customized amount of the targeted media content during playback of the media content item, wherein to configure the one or more playback settings the at least one processor is further configured to:
unpackage the media content item to identify a plurality of media content assets;
identify at least a portion of the plurality of media content assets that are associated with targeted media content; and
modify the portion of the plurality of media content assets that are associated with the targeted media content to accommodate the customized amount of the targeted media content; and
send, to the media device, the media content item and the customized amount of the targeted media content.

2. The system of claim 1, wherein the at least one processor is configured to perform operations comprising:
process, by a machine learning model, the user input to determine the customized amount of the targeted media content.

3. The system of claim 1, wherein the at least one processor is configured to perform operations comprising:
process, by a machine learning model, the user input to identify at least one other media content item for recommendation to a user associated with the media device.

4. The system of claim 1, wherein the one or more playback settings include at least one of a number of slots for presenting the targeted media content and a duration of one or more slots for presenting the targeted media content.

5. The system of claim 1, wherein the at least one processor is configured to perform operations comprising:

send the user input indicative of the preferred level of exposure to targeted media content to a service provider associated with a third-party application configured to deliver media content on the media device.

6. The system of claim 1, wherein the user input is associated with at least one of a user profile, a user account, the media device, the media content item, and a media content type.

7. The system of claim 1, wherein the media content item corresponds to at least one of on-demand media content, linear media content, and live media content.

8. The system of claim 1, wherein the user input is received via a user interface element that includes at least a first option for increasing the preferred level of exposure to the targeted media content and at least a second option for decreasing the preferred level of exposure to the targeted media content.

9. The system of claim 8, wherein the first option for increasing the preferred level of exposure to the targeted media content is associated with a value proposition and the second option for decreasing the preferred level of exposure to the targeted media content is associated with a cost.

10. A computer-implemented method for processing media content, the computer-implemented method comprising:

receiving, from a media device, a user input indicative of a preferred level of exposure to targeted media content;

configuring, based on the user input, one or more playback settings associated with a media content item to accommodate a customized amount of the targeted media content during playback of the media content item, wherein configuring the one or more playback settings further comprises:

unpackaging the media content item to identify a plurality of media content assets;

identifying at least a portion of the plurality of media content assets that are associated with targeted media content; and modifying the portion of the plurality of media content assets that are associated with the targeted media content to accommodate the customized amount of the targeted media content; and sending, to the media device, the media content item and the customized amount of the targeted media content.

11. The computer-implemented method of claim 10, further comprising:

processing, by a machine learning model, the user input to determine the customized amount of the targeted media content.

12. The computer-implemented method of claim 10, further comprising:

processing, by a machine learning model, the user input to identify at least one other media content item for recommendation to a user associated with the media device.

13. The computer-implemented method of claim 10, wherein the one or more playback settings include at least one of a number of slots for presenting the targeted media content and a duration of one or more slots for presenting the targeted media content.

14. The computer-implemented method of claim 10, further comprising:

sending the user input indicative of the preferred level of exposure to targeted media content to a service provider associated with a third-party application configured to deliver media content on the media device.

15. The computer-implemented method of claim 10, wherein the user input is associated with at least one of a user profile, a user account, the media device, the media content item, and a media content type.

16. The computer-implemented method of claim 10, wherein the media content item corresponds to at least one of on-demand media content, linear media content, and live media content.

17. The computer-implemented method of claim 10, wherein the user input is received via a user interface element that includes at least a first option for increasing the preferred level of exposure to the targeted media content and at least a second option for decreasing the preferred level of exposure to the targeted media content.

18. A non-transitory computer-readable medium having instructions stored thereon that, when executed by at least one computing device, cause the at least one computing device to perform operations comprising:

receive, from a media device, a user input indicative of a preferred level of exposure to targeted media content;

configure, based on the user input, one or more playback settings associated with a media content item to accommodate a customized amount of the targeted media content during playback of the media content item, wherein to configure the one or more playback settings the instructions further cause the at least one computing device to:

unpackage the media content item to identify a plurality of media content assets;

identify at least a portion of the plurality of media content assets that are associated with targeted media content; and modify the portion of the plurality of media content assets that are associated with the targeted media content to accommodate the customized amount of the targeted media content; and send, to the media device, the media content item and the customized amount of the targeted media content.

* * * * *